United States Patent [19]

Fischer et al.

[11] Patent Number: 4,966,188
[45] Date of Patent: Oct. 30, 1990

[54] PNEUMATICALLY OPERATED GAS-PRESSURE CONTROLLER

[75] Inventors: Rudolf Fischer, Kassel; Josef Gartner, Sohrewald, both of Fed. Rep. of Germany

[73] Assignee: Regal + Messtechnik GmbH, Kassel, Fed. Rep. of Germany

[21] Appl. No.: 394,583

[22] Filed: Aug. 16, 1989

[30] Foreign Application Priority Data

Aug. 18, 1988 [DE] Fed. Rep. of Germany ....... 3828002

[51] Int. Cl.$^5$ .............................................. G05D 16/16
[52] U.S. Cl. .................................. 137/489; 137/492.5
[58] Field of Search ...................... 137/489, 492, 492.5

[56] References Cited

U.S. PATENT DOCUMENTS

| 3,592,223 | 7/1971 | Reese | 137/489 |
| 4,026,513 | 5/1977 | Callenberg | 137/489 X |
| 4,135,697 | 1/1979 | Brumm | 137/489 X |

Primary Examiner—Alan Cohan
Attorney, Agent, or Firm—Collard, Roe & Galgano

[57] ABSTRACT

A pneumatically operated gas-pressure controller is provided having a setting device and a controller, wherein the controlling gas for the energy supply of the controller is drawn on the input side of the gas-pressure controller, fed to the controller by means of a throttle valve and discharged on the outlet side by means of a drain conduit. The controller supplies the setting pressure for the setting device by means of a setting pressure conduit and includes a twin diaphragm system having two diaphragms with different surface areas, the diaphragms are interconnected and arranged one above the other so as to oppose one another. A booster valve is associated with the diaphragm having the smaller surface area and is acted upon by the setting pressure.

2 Claims, 1 Drawing Sheet

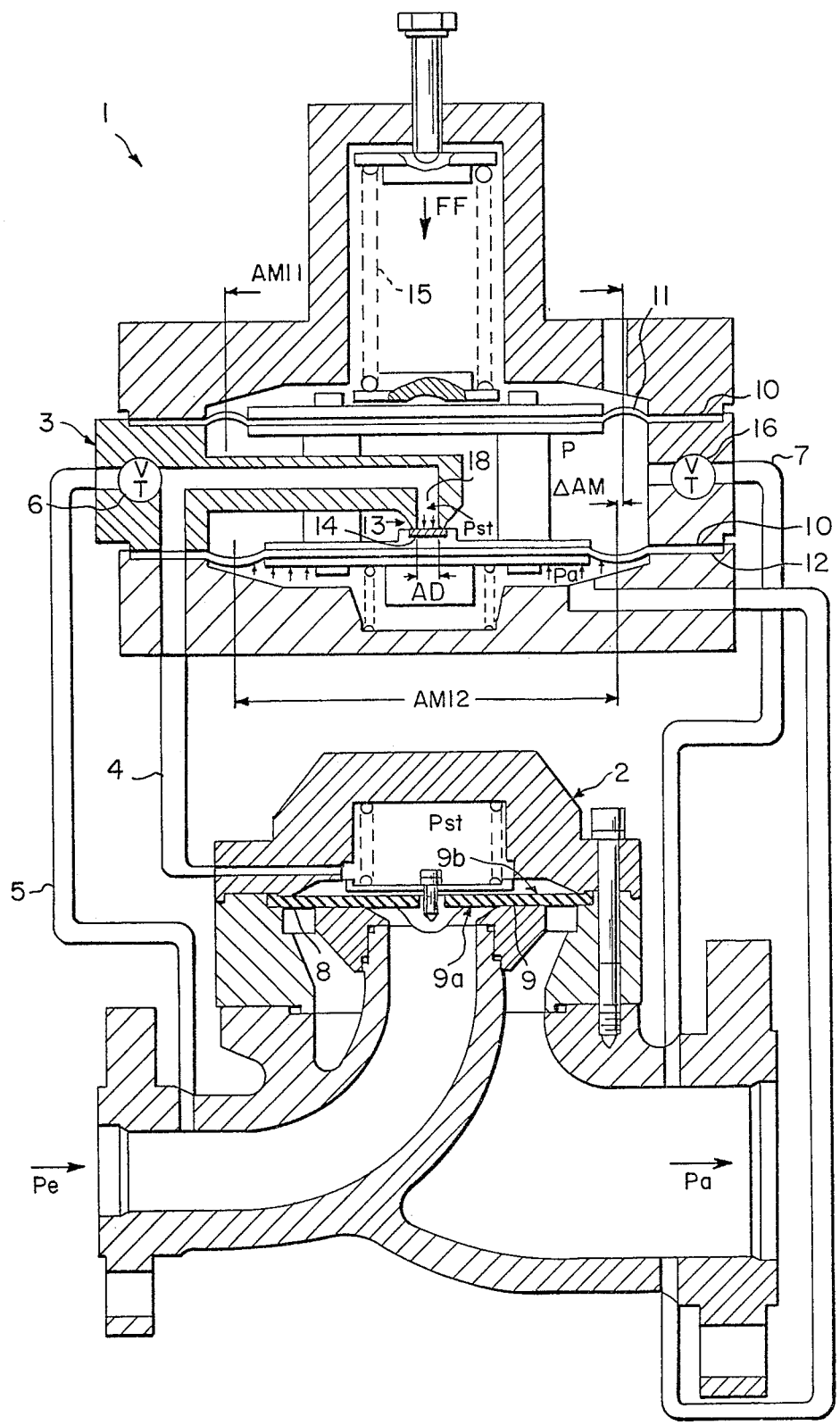

PNEUMATICALLY OPERATED GAS-PRESSURE CONTROLLER

The present invention relates to a pneumatically operated gas-pressure controller and, more particularly, to such a gas-pressure controller which consists of a setting device and a controller, wherein the controlling gas for the energy supply of the controller is drawn on the inlet side of the gas-pressure controller, fed to the controller via a throttle valve, and discharged at the outlet through a drain conduit, the controller includes a twin diaphragm system and supplies the setting pressure for the setting device through a setting pressure conduit.

The gas-pressure controller, as described above, is a device in which the setting element of the setting device is opened by reducing the setting pressure below the value of the inlet pressure by means of the controller. This means that the setting pressure generated by the controller is a function of the inlet pressure. Thus, variations in the inlet pressure result in variations in the setting pressure, which in turn cause an undesirable change in the outlet pressure.

The control accuracy of such a controller is measured by the extent to which such a controller is capable of keeping the outlet pressure constant irrespective of changes or variations in the inlet pressure. To accomplish this, it is well known to provide a controller with an auxiliary pressure stage, which compensates for changes in the inlet pressure in such a way that variations in the inlet pressure will not result in variations in the outlet pressure. Gas-pressure controllers having such an auxiliary pressure stage require a heavy engineering investment and are, therefore, expensive.

The object of the present invention is to provide a gas-pressure controller wherein the outlet pressure is maintained even though there are variations in the inlet pressure without the necessity of an additional auxiliary pressure stage for that purpose.

The above object is accomplished in accordance with the present invention by providing a gas-pressure controller, as first described above, with two diaphragms in the twin diaphragm system of the controller having different surface areas.

Thus, in the gas-pressure controller of the present invention, the two diaphragms of the controller are interconnected and arranged oppositely, one above the other. The diaphragm arranged on the side of the booster valve has a smaller surface area than the other, oppositely disposed diaphragm. The booster valve itself consists of a baffle plate connected with the diaphragm, and a nozzle having a defined cross section rigidly arranged in the casing and acted upon by the setting pressure.

By enlarging the effective surface area of the diaphragm disposed opposite the diaphragm arranged on the side of the booster valve, a force is generated by the pressure between the two diaphragms, such force counteracting the force produced by the booster valve acting on the other diaphragm. In order for there to be such a pressure build-up, the drain conduit is provided with a throttling function.

Since both the resultant pressure force and the force applied to the diaphragm by the booster valve depend on the inlet pressure and hence on the setting pressure, the two forces are compensated for by selecting the difference between the two diaphragm surface areas accordingly, with the result that the outlet pressure does not vary with a variation in the inlet pressure.

In an advantageous embodiment of the invention, provision is made for an adjustable throttle valve in the drain conduit. This permits a fine adjustment of the pressure compensation because the pressure between the two diaphragms of the controller can be varied depending on the flow-through and thus on the setting pressure, so that tolerances with respect to the diaphragm surface areas can be compensated for.

Other objects and features of the present invention will become apparent from the following detailed description considered in connection with the accompanying drawing. It is to be understood, however, that the drawing is designed as an illustration only and not as a definition of the limits of the invention.

The drawing shows a cross-sectional view of an embodiment of a gas-pressure controller according to the present invention.

In the drawing, gas-pressure controller 1 consists of a setting device 2 mounted in the controlling line, and a controller 3 connected with setting device 2 by setting pressure conduit 4. The controlling gas for the supply of energy for controller 3 is drawn on the inlet side of the gas-pressure controller and fed to controller 3 via conduit 5 and throttle valve 6. The controlling gas is then discharged on the outlet side through drain conduit 7.

Setting device 2 consists of setting element 8, which is connected with setting diaphragm 9. The inlet pressure Pe is admitted to the underside 9a of setting diaphragm 9, and the setting pressure Pst acts on the top side 9b of the diaphragm. The setting pressure Pst is lower than the inlet pressure Pe because it is led to the top side 9b of diaphragm 9 by means of throttle valve 6. Setting element 8 opens when the difference between the inlet pressure Pe and the setting pressure Pst exceeds a defined value.

Controller 3 basically consists of a twin diaphragm system, designated 10, comprised of two diaphragms 11 and 12, which are arranged one above the other and rigidly connected with one another, wherein booster valve 13 is associated with diaphragm 12. In this arrangement, the setting pressure Pst acts on surface area AD of baffle plate 14 which is connected with the diaphragm 12. Surface area AD is delineated by nozzle 18. Externally, twin diaphragm system 10 is acted upon by outlet pressure Pa, on one side, and force FF of nominal value spring 15 on the other side, with outlet pressure Pa representing the actual value, which is compared to the nominal value established by nominal value spring 15. By changing the open position of booster valve 13, differences between the nominal and actual values lead to the required influencing of the setting pressure and finally to the required open position of setting element 8.

In explaining the way in which controller 3 functions, it is assumed, to begin with, that the effective surface areas of diaphragms 11 and 12 of twin diaphragm system 10 are approximately of the same size. Since the direction of action of the setting pressure in booster valve 13 is additive to the direction of action of nominal value spring 15, the controller is in a state of equilibrium when the setting pressure ($Pst \times AD$) acting on baffle plate 14 and the force FF of nominal value spring 15 equals the force generated by outlet pressure Pa on the diaphragm surface area AM of diaphragm 12. The formula determined by this state of equilibrium is:

$$Pa \times AM = FF + Pst \times AD$$

This formula demonstrates that any change in the setting pressure Pst connected with a variation in the inlet pressure Pe is necessarily connected with an undesirable change in the outlet pressure Pa.

To avoid this, an additional force must be produced, which must satisfy the following three conditions:

1. The force must be directed against the force by which the setting pressure acts upon the baffle plate, which is connected with diaphragm 12;
2. The force must be the same as the force (Pst×AD) applied to diaphragm 12 by booster valve 13; and,
3. The force must change as a function of inlet pressure Pe.

The starting point for consideration leading to the generation of such a force is that a greater amount of gas flows into the setting pressure space through throttle valve 6 at a higher inlet pressure Pe, which gas is fed again to the outlet side by means of booster valve 13 and drain conduit 7. When throttle valve 16 is installed in drain conduit 7, it results in a dynamic pressure P being produced between diaphragms 11 and 12. The value of pressure P depends upon the amount of gas flowing off, and hence upon the value of the inlet pressure or setting pressure. From this follows that pressure P between diaphragms 11 and 12 varies depending on the setting pressure. If diaphragm 11 is provided with an effective surface area that is AM larger than the effective surface area of diaphragm 12 ($\Delta AM = AM11 - AM12$), the pressure P in the space between diaphragms 11 and 12 produces a force that is directed against the force applied by the setting pressure to baffle plate 14, which is connected with diaphragm 12. The inlet or setting pressure is immediately compensated for when the following formula applies:

$$P \times \Delta AM = Pst \times AD$$

By providing an adjustable throttle valve 16 in drain conduit 7, it is possible to influence the pressure between diaphragms 11 and 12, so that it is thus possible to finely adjust the pressure compensation in a simple manner.

While only a single embodiment of the present invention has been shown and described, it will be obvious that many changes and modifications may be made thereto without departing from the sphere and scope of the invention.

What is claimed is:

1. A pneumatically operated gas-pressure controller, comprising:
    a setting device;
    a controller, coupled to said setting device, wherein the controlling gas for the energy supply of the controller is drawn on the input side of the gas-pressure controller, fed to the controller by means of a throttle valve and discharged on the outlet side by means of a drain conduit, and the controller supplies the setting pressure for the setting device by means of a setting pressure conduit, said controller including a twin diaphragm system having two diaphragms with different surface areas, said two diaphragms being interconnected and arranged one above the other so as to oppose one another;
    a booster valve associated with one of the two diaphragms of the twin diaphragm system of the controller, said diaphragm associated with said booster valve having a smaller surface area than the other, oppositely disposed diaphragm, said booster valve having a baffle plate connected with the smaller surface area diaphragm and a nozzle having a defined cross-section, said booster valve being acted upon by the setting pressure; and
    a throttle valve defined in said drain conduit.

2. The pneumatically operated gas-pressure controller as defined in claim 1, wherein said throttle valve in said drain conduit is adjustable.

* * * * *